UNITED STATES PATENT OFFICE.

JAMES F. SALLOWS, OF LANSING, MICHIGAN, ASSIGNOR TO THE SALLOWS PATENTED STEEL TREATING PROCESS COMPANY, OF LANSING, MICHIGAN.

PROCESS FOR PRODUCING AND FINISHING GEARS AND OTHER CARBONIZED-STEEL PARTS.

14,820. Specification of Reissued Letters Patent. Reissued Mar. 16, 1920.

No Drawing. Original No. 1,282,467, dated October 22, 1918, Serial No. 205,976, filed December 7, 1917
Application for reissue filed December 15, 1919. Serial No. 345,032.

*To all whom it may concern:*

Be it known that I, JAMES F. SALLOWS, a citizen of the United States, and a resident of the city of Lansing, county of Ingham, State of Michigan, have invented certain new and useful Improvements in Processes for Producing and Finishing Gears and other Carbonized-Steel Parts, of which the following is a specification.

The purpose of this invention is to provide an improved process for producing carbonized and hardened steel parts requiring accuracy of dimension and form without grinding as the final process of finishing to form and treating for removing scale, because the usual steps of carbonizing and hardening produce not only internal stresses but also deformation, and tool finishing cannot be resorted to after the hardening is completed, and therefore the deformation can be corrected only by a process which can be applied to the hardened material such as, for example; the process of grinding and polishing.

I have overcome this difficulty by the following process:

I first produce as by forging the article desired in the rough, or of approximately the form and dimension required. I next "rough-machine" the part to a still closer approximation of the form and dimension required but to a substantially uniform oversize. For the third step I case-harden the part employing the usual means and processes for carbonizing it quite deeply, upon the conclusion of the carbonizing step I quench the parts directly in oil, first allowing them to cool in the pots to the proper temperature for hardening and refining the core by quenching. The case produced should exceed the oversize by the depth of the case desired in the finished part.

As the next step, I box the parts in carbon dust, that is, inclose them in a box and pack with carbon dust, and heat the package to proper temperature for annealing, that is to say, about 1400 degrees F., and permit it to remain in the heating furnace a proper length of time to produce the desired structure of the case. I then remove the package from the furnace and allow it to cool in the atmosphere, or normally without unboxing. The next step consists in finish-machining the part to final form.

I then repack the parts in carbon in a box, and reheat to a temperature of about 1200 to 1400 degrees F., depending upon the material used. This temperature is reached, not suddenly, but by a rate of increase which is determined by the kind and size of the part, so that substantially no changes will take place in either the expansion or shrinkage forces already in the part. The parts are then removed from the packing material and quenched in either oil or water, depending upon the kind of steel used.

The parts produced in this manner are found to have the form and dimensions to which they were finish-machined, without warping or distortion of any sort, and apparently without injurious internal stresses.

Having thus described my invention, what I claim as new and desire to secure by Letters Patent is:

1. The process of producing carbonized and hardened steel parts comprising the following steps: first, rough forming the parts; second, rough-machining parts to approximately the form and outline required; third, carbonizing deeply and quenching in oil; fourth, annealing by boxing in moderately insulating material, such as carbon-dust, heating and allowing to cool normally in the atmosphere without unboxing; fifth, finish-machining; sixth, reboxing in moderately insulating material, such as carbon-dust; reheating at a determined rate of increase of temperature and quenching in oil or water according to the kind of steel used.

2. The process of producing carbonized and hardened steel parts comprising the following steps: first, rough forming the parts; second, rough-machining the parts to approximately the form and outline required but to a substantially uniform oversize; third, carbonizing to a depth exceeding the oversize by the depth of the case desired in the finished part by case hardening process and quenching; fourth, annealing by heating and cooling while unexposed to the atmosphere; fifth, machine finishing; sixth, reheating slowly and quenching.

In witness whereof I have hereunto set my hand and seal in the presence of two witnesses.

JAMES F. SALLOWS.

Witnesses:
D. J. MEAD,
F. S. PORTER.